(12) United States Patent
Liu et al.

(10) Patent No.: US 9,715,569 B1
(45) Date of Patent: Jul. 25, 2017

(54) METHODS, SYSTEMS, AND ARTICLES OF MANUFACTURE FOR IMPLEMENTING AN ELECTRONIC DESIGN WITH DISCONNECTED FIELD DOMAINS

(71) Applicant: Cadence Design Systems, Inc., San Jose, CA (US)

(72) Inventors: Jian Liu, Dublin, CA (US); Xiande Cao, San Jose, CA (US); Jian Chen, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/754,605

(22) Filed: Jun. 29, 2015

(51) Int. Cl.
   G06F 17/50     (2006.01)
   G21K 5/00      (2006.01)
   G03F 1/00      (2012.01)

(52) U.S. Cl.
   CPC ...... *G06F 17/5081* (2013.01); *G06F 17/5072* (2013.01); *G03F 1/00* (2013.01); *G06F 2217/12* (2013.01); *G21K 5/00* (2013.01)

(58) Field of Classification Search
   CPC ............ G06F 17/5072; G06F 17/5081; G06F 2217/12; G21K 5/00; G03F 1/00
   USPC ......... 716/132, 122, 111, 54, 55, 51; 703/14
   See application file for complete search history.

(56) References Cited

U.S. PATENT DOCUMENTS

| | | | |
|---|---|---|---|
| 6,084,779 A | 7/2000 | Fang | |
| 8,682,625 B2 | 3/2014 | Liu et al. | |
| 8,694,568 B2 | 4/2014 | Li et al. | |
| 8,874,422 B2 | 10/2014 | Liu et al. | |
| 2005/0064299 A1* | 3/2005 | Lu | B82Y 10/00 430/5 |
| 2005/0089770 A1* | 4/2005 | Liu | G03F 1/34 430/5 |
| 2008/0097641 A1* | 4/2008 | Miyashita | G06F 17/5031 700/121 |
| 2012/0269230 A1 | 10/2012 | Li et al. | |
| 2013/0006584 A1 | 1/2013 | Liu et al. | |
| 2013/0124181 A1 | 5/2013 | Liu et al. | |
| 2013/0138402 A1 | 5/2013 | Fang et al. | |
| 2013/0138417 A1 | 5/2013 | Liu et al. | |

OTHER PUBLICATIONS

Lei et al., Chinese Patent Document No. CN 101834153 A, published Sep. 15, 2010, english abstract and 1 drawings only.*

* cited by examiner

*Primary Examiner* — Phallaka Kik
(74) *Attorney, Agent, or Firm* — Vista IP Law Group, LLP

(57) ABSTRACT

Disclosed are techniques for devising an electronic design with disconnected field domains. These techniques identify a plurality of electrically conductive shapes of an electronic design, add a plurality of patches to a model of the electronic design for multiple apertures in the electronic design, analyze the model to generate analysis results for the electronic design, and devise or implement the electronic design based in part or in whole upon the analysis, wherein an aperture of the multiple apertures causes disconnected electromagnetic field domains in the model.

20 Claims, 17 Drawing Sheets

---

402 IDENTIFY METAL SHAPES ON ONE OR MORE LAYERS OF AN ELECTRONIC DESIGN

↓

404 IDENTIFY APERTURE(S) FORMED BY MULTIPLE METAL SHAPE BOUNDARY SEGMENTS FROM ONE OR MORE LAYERS IN THE ELECTRONIC DESIGN

↓

406 ADD PATCH(ES) ON ONE OR MORE FLOATING PLANE(S) IN A MODEL FOR THE ELECTRONIC DESIGN, THE PATH(ES) HAVING SIZE(S) / SHAPE(S) OF THE CORRESPONDING APERTURE(S) PLUS A CONSTANT MARGIN OR VARIABLE MARGINS

METHODS, SYSTEMS, AND ARTICLES OF MANUFACTURE FOR IMPLEMENTING AN ELECTRONIC DESIGN WITH DISCONNECTED FIELD DOMAINS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design (e.g., IC package designs, printed circuit board or PCB designs, etc.) often include multi-layered structures to increase or maximize the available space. Accompanying the increasingly popular use of multi-layered structured structures is the analysis of the electromagnetic filed for the electronic product. Three-dimensional (3D) approaches modeling the structures and analyzing the electromagnetic field domain in the three-dimensional space may be used to solve the problem yet requires long and often prohibitively long runtime to reach some reasonably accurate solutions. Pseudo-3D or two-and-a-half-dimensional (2.5D) approaches have also been widely used due to their expediency in reaching reasonably accurate solutions. These pseudo-3D approaches pose a different set of problems with modern multi-layered electronic designs because these approaches reduce some of the three-dimensional features with the two-dimensional modeling and may thus erroneously model, for example, a short circuit into an open circuit in electronic designs having certain configurations.

For example, an electromagnetic field between two metal shapes are modeled only inside the parallel plate field domain between two metal shapes in conventional pseudo-3D modeling or analysis tools. That is, the electromagnetic field is modeled only in the overlapping region between the two metal shapes when viewed from the plane perpendicular to the planes on which the two metal shapes reside. This pseudo-3D modeling techniques create two disconnected field domains even when the respective structures creating these two field domains are electrically connected to each other. FIG. 1 illustrates a simplified representation of such a problem. In the configuration shown in FIG. 1B, conventional pseudo-3D approaches model the electromagnetic field domains only between two parallel plates, and thus the field domains only exist in the region 108B between parallel plates 104B and 102B as well as in the region 110B between parallel plates 102B and 106B. These two field domains will be treated as disconnected whereas the circuit structures creating these two field domains are electrically connected.

Conventional approaches then solve the disconnected field domain issue by inserting a single floating plane to cover the entire area of the electronic design to avoid such disconnected field domains. These approaches may effectively solve the disconnected field domain issues, but they also introduce another class of issues. By covering the entire area of the electronic design with a single floating plane to provide continuity paths for disconnected field domains that should have been connected, the introduction of the single floating plane and modeling the floating plane as a metal plane to provide continuity disturbs the electronic design to an extent that often leads to inaccurate results in analyses of electrical properties (e.g., inductance, capacitance, etc.) and the electromagnetic fields.

Therefore, there exists a need for a method, system, and computer program product for implementing or devising an electronic design with disconnected field domains to address various shortcomings and disadvantages of conventional approaches.

SUMMARY

Disclosed are method(s), system(s), and article(s) of manufacture for implementing or devising an electronic design with disconnected field domains in various embodiments. Some first embodiments are directed at a method for implementing or devising an electronic design with disconnected field domains.

In these first embodiments, a plurality of metal shapes in an electronic design may be identified; and a plurality of patches may be added to a model representing the electronic design for multiple apertures in the electronic design. The model may then be analyzed to generate analysis results for the electronic design; and the electronic design may be devised based in part or in whole upon the analysis results. In some embodiments, the model is provided to a hybrid, pseudo-three-dimensional (pseudo-3D), or two-and-a-half-dimensional (2.5D) solver (collectively hybrid solvers or pseudo-3D solvers) to solve for the electrical behavior of the underlying electronic design. The electrical behavior of electronic designs may be accurately determined throughout a wide range of operating frequencies even though the electronic design under test has a plurality of apertures causing disconnected electromagnetic field domains in the model. A hybrid or 2.5D solver may be used to analyze the model representing the electronic design under test with the techniques described herein, without using any 3D solvers, while producing equally or approximately accurate analysis or simulation results for the 3D model of the electronic circuit design.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a design aggregation mechanism, an aperture identification mechanism, a patching mechanism, a discretization mechanism, a reference plane or floating plane insertion mechanism, and/or a model generator and simulator in some embodiments.

Each of these mechanisms may include or function in tandem with electrical circuitry and one or more micro-processors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A mechanism is initialized in a computing system so that the software portion of the mechanism is stored in memory (e.g., random access memory) to be executed by one or more processors or processor cores off the computing system to perform at least a part of the functionality of the mechanism. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for verifying connectivity of an electronic design are described below with reference to FIGS. 1-7.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
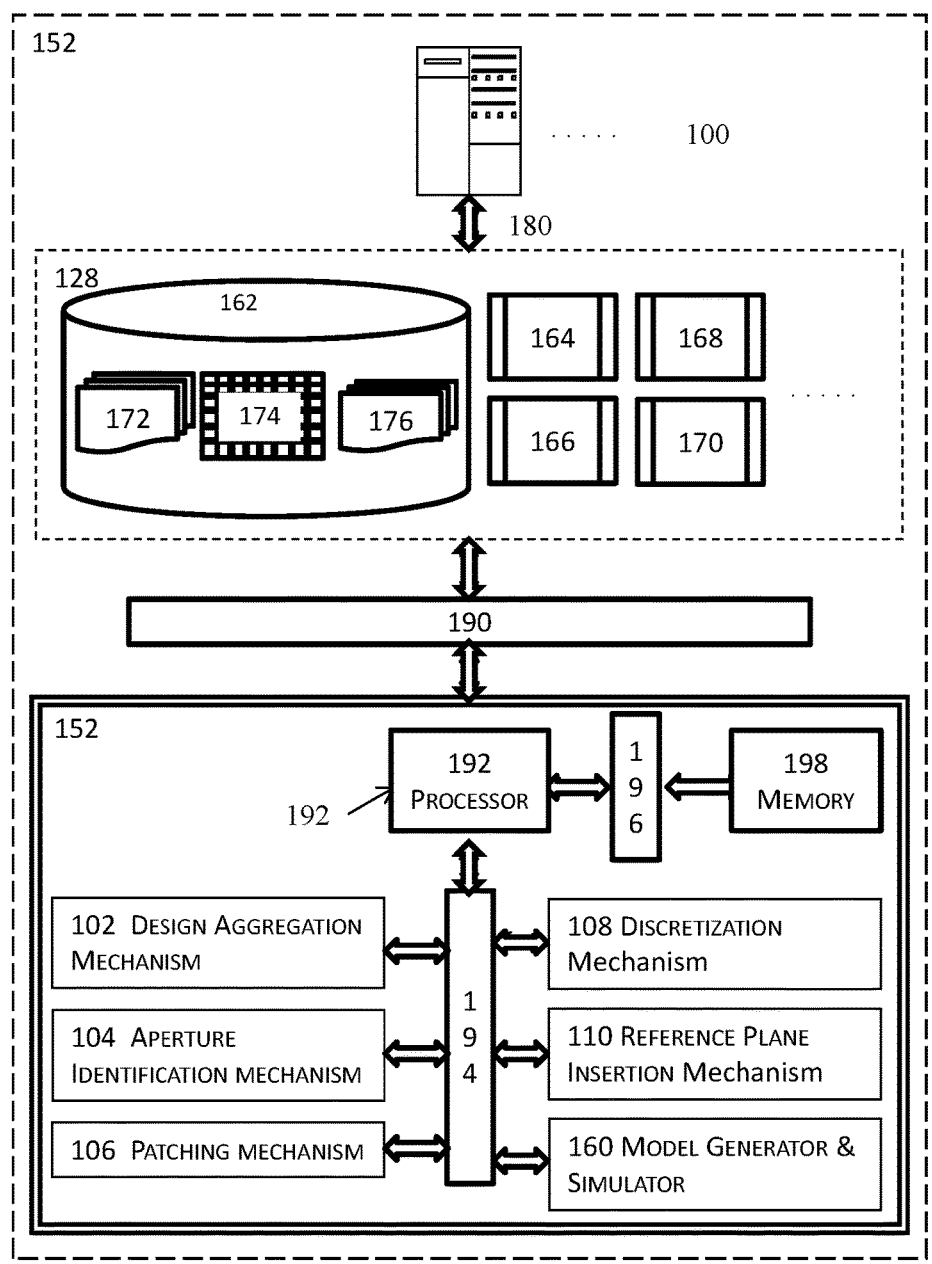
FIG. 1A illustrates a high level schematic block diagrams for implementing or devising an electronic design with disconnected field domains in one or more embodiments.

Various embodiments are directed to a method, system, and computer program product for verifying connectivity of an electronic design. Other objects, features, and advantages of the invention are described in the detailed description, figures, and claims.

Unlike conventional approaches, the techniques described herein do not cover the entire electronic design by using a single floating plane regardless of where disconnected field domains may actually exist in the electronic design. Rather, these techniques first identify "apertures" in a multi-layered electronic design and selectively patch these "apertures" with patches of a certain size and shapes to reduce or eliminate the disconnected field domain issues while reducing or minimizing the disturbances to the original electronic design caused by the introduction of these selective patches. In this manner, the techniques not only provide the information of where disconnected field domains may occur but also prevent or reduce the possibility of having disconnected field domain issues in analyzing the electromagnetic characteristics of the electronic design while reducing or minimizing the disturbance to the electronic design by using specifically determined patches to cover the identified "apertures".

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-7.

In some embodiments, these techniques may first identify the existence of apertures in a multi-layered electronic design. In some embodiments, these techniques may discretize or mesh the metal shapes (and optionally components of other materials such as dielectrics or empty space for subsequent electromagnetic or electrical analyses) on each layer of the multi-layered electronic design with, for example, finite difference or finite element methods. By meshing metal shapes on each layer of the electronic design, these techniques may quickly and efficiently determine which portions of an electronic design are occupied by electrically conductive shapes, and which portions are not for each layer by using, for example the mesh and/or one or more properties associated therewith.

Other approaches may also be used for aperture identification. For example, shape or pattern recognition may also be used for aperture identification. Regardless of the approaches used to recognize and identify which areas are occupied or unoccupied by electrically conductive shapes, these techniques then project or flatten al the discretized metal shapes onto a plane that is parallel to a layer in the multi-layered structure or onto one of the multiple layers in the multi-layered structure.

As described earlier, these techniques first process the multi-layered structure to be aware of whether any particular areas are not occupied by any electrically conductive shapes on a layer, these techniques may then identify apertures from the flattened or projected structures. Once apertures are identified, patches may be determined and placed on one or more floating planes. These patches completely cover the apertures in the electronic design when both these patches and the apertures are projected onto a plane.

These techniques described herein also avoid covering all the apertures or at least most of the apertures (e.g., more than 50% of the identified apertures) by a single patch to reduce, minimize, or eliminate artificial effects caused by the introduction of these patches on the one or more floating planes. The patches and the floating planes may be added to a model that represents an electronic design under test. The model may be provided to a non-3D solver with appropriate boundary conditions to determine the electrical behavior of the electronic design under test.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level schematic block diagrams for implementing or devising an electronic design with disconnected field domains in one or more embodiments. More specifically, FIG. 1A illustrates an illustrative high level schematic block diagrams for constructing a simulation schematic of an electronic design across multiple design fabrics and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises a design aggregation mechanism 102 to aggregate a plurality of electronic circuit component designs (e.g., shapes) or a part thereof (e.g., edges of shapes) to create an aggregated view for the electronic design and an aperture identification mechanism 104 to identify one or more apertures from an aggregated view of an electronic design.

The set of mechanisms 152 may further optionally include a patching mechanism 106 to determine one or more sizes for patches to be applied to a model of an electronic design, a discretization mechanism 108 to discretize electronic circuit component designs into meshes or finer subdivisions, a reference plane insertion mechanism 110 to determine and insert one or more floating reference planes to a model for an electronic circuit design, and model generation and simulation mechanism 160 to construct a model for an electronic circuit design and to analyze or simulate the model to determine the electrical behavior of the underlying electronic circuit design.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
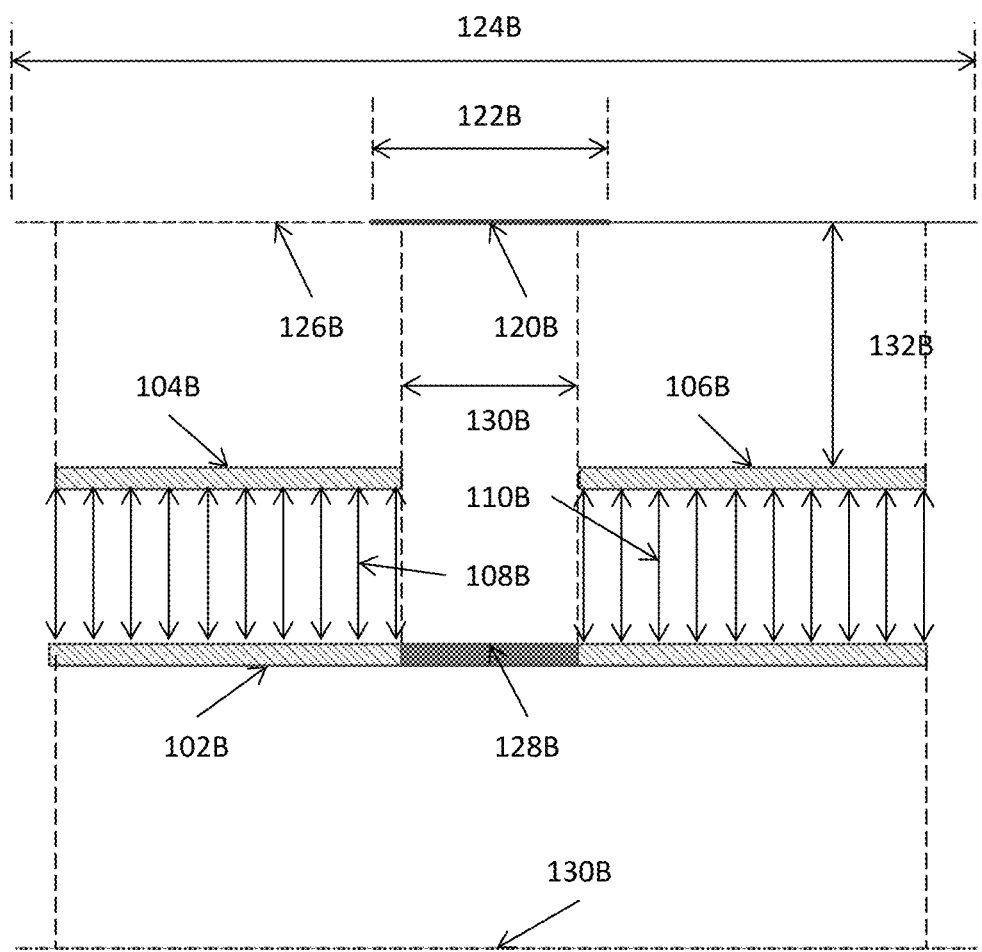
FIG. 1B illustrates an in-plane, side view of a portion of a simplified electronic design to demonstrate some techniques for handling disconnected field domains in one or more embodiments.
Figure 1C:
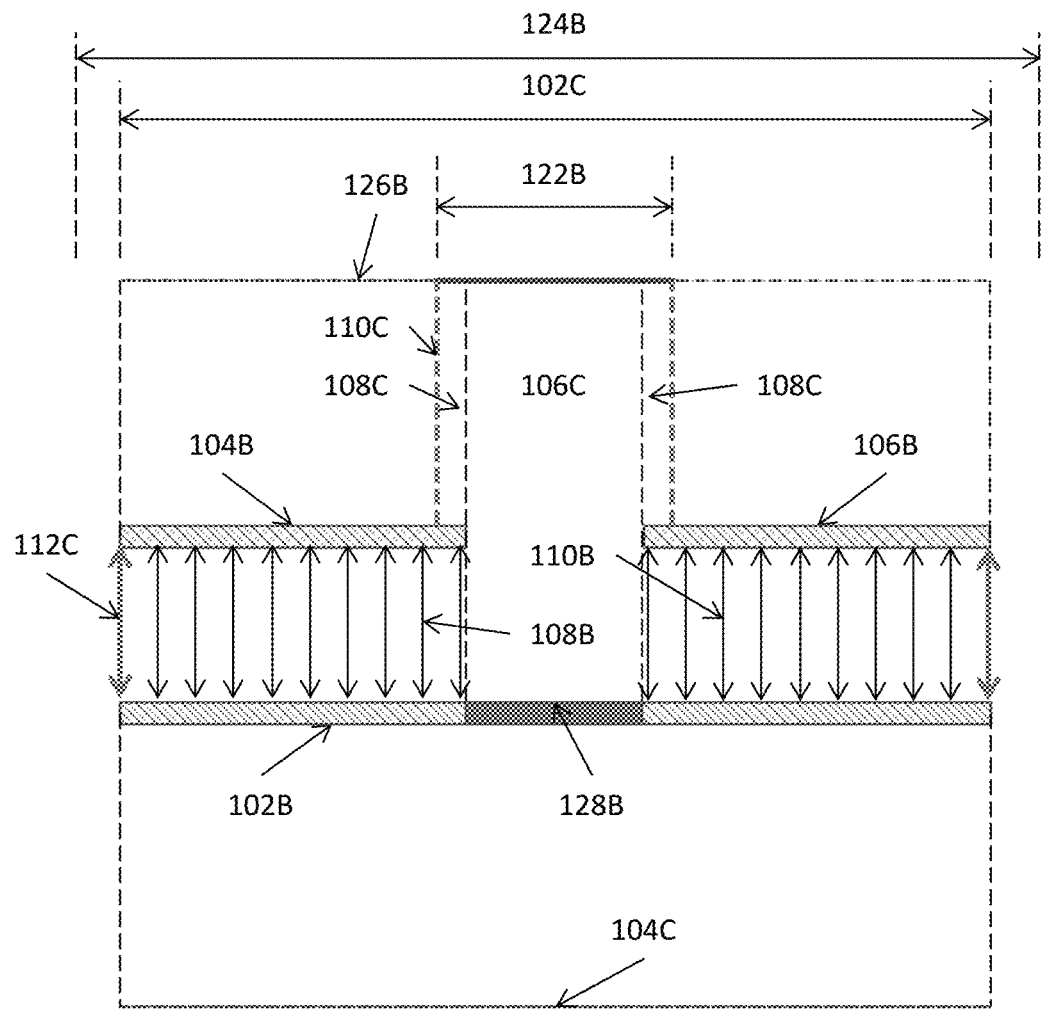
FIG. 1C illustrates trimming floating planes remove electromagnetic field domains between floating planes in one or more embodiments.

FIG. 1B illustrates an in-plane, side view of a portion of a simplified electronic design to demonstrate some techniques for handling disconnected field domains in one or more embodiments. The portion of the simplified electronic design includes two separate metal shapes 104B and 106B that are electrically connected to a single metal shape 102B having an aperture caused by, for example, a cutout 128B in the metal shape 102B and indicated by 130B.

In the portion of the simplified electronic design illustrated in FIG. 1B, conventional pseudo-3D (three-dimensional) approaches model the electromagnetic field domains only between two parallel plates, and thus the field domains exist only within the region 108B between parallel plates 104B and 102B as well as in the region 110B between parallel plates 102B and 106B. These two field domains will be treated as disconnected field domains whereas the circuit structures creating these two field domains are electrically connected.

More specifically, disconnected field domains exist because some non-3D solvers model electromagnetic field domains only inside the region between two parallel metal shapes. If two field domains (108B and 110B) are connected by a single metal shape (102B) as shown FIG. 1B, the electromagnetic coupling between these two field domains (108B and 110B) through the single metal shape (102B) will not be considered. This is because these non-3D solvers operate under the premise that an electromagnetic field does not propagate along a single metal shape, and the portion of the metal shape 102B that is not a part that forms a parallel field domain is exposed to an open space and thus cannot be modeled in these non-3D solvers due to the existence of an infinite domain that cannot be approximated in these non-3D solvers unless an artificial boundary is imposed.

Not accounting for the coupling between the metal shapes 104B and 106B in these non-3D approaches may lead to incorrect results such as incorrect or incomplete current return paths or electrical behavior of the electronic design under test. These incorrect results are especially noticeable in lower frequency electronic circuit designs. In some embodiments, the shapes (e.g., 104B, 106B, and 102B) in the electronic design may be aggregated into an aggregated view. The aggregated view or the shapes therein may be discretized with a mesh generation mechanism (e.g., the discretization mechanism 108 in FIG. 1A) using, for example, an adaptive mesh generation mechanism.

Discretization of the aggregated view or the shapes therein serves multiple purposes. Other than mesh generation to approximate a complex shape with small elements (e.g., a polygonal or polyhedral mesh in a two-dimensional space or tetrahedra, hexahedra, etc. in a three-dimensional space) for various simulation tools, the discretization may also generate the mesh for the shapes in the electronic design, and the mesh may be further used to identify the apertures in the electronic design.

An aperture includes an enclosed region that is not occupied by any shapes in any layers of an electronic design. It shall be noted that an aperture may have any shape. It shall be further that an aperture is enclosed when the edges of the aperture are projected onto a plane, but not all of the edges of an aperture are necessarily on the same layer. Rather, the edges enclosing an aperture may belong to one or more layers.

Moreover, a notch situated at the boundary of an electronic design is not an aperture because an aperture is enclosed by edges, whereas a notch is open on one side. For example, notch 204B in FIG. 2B is not an aperture because the lower side of notch 204B remains open. The existence of an aperture leads to disconnected field domains because electromagnetic coupling between metal shapes near the boundary of the aperture may not be accurately captured with solvers other than three-dimensional (3D) solvers. As a result of such disconnected field domains, current return paths may not be correctly determined, and the electrical behavior may also be incorrect. In some cases, these disconnected field domains may also render the modeling overly sensitive to slight changes in the electronic design or electrical properties thereof.

To accurately model an electronic design that typically includes apertures, some approaches add an artificial domain boundary or a patch on a floating plane to cover the entire electronic design without determining or knowing where these apertures are located or the sizes or shapes of these aperture. In the example illustrated in FIG. 1B, these approaches add a patch on a floating plane 124B or 130B over the electronic design to cover the entire electronic design or nearly the entire design. This patch, when added on the floating plane to the model of the electronic design in FIG. 1B, eliminates the aperture caused by the cutout 128B in the metal shape 102B.

Although these approaches may save some runtime or computational resources by not determining the locations, sizes, and/or shapes of these apertures and by simply and non-selectively covering the entire electronic design with an oversize patch on the floating plane, the electrical behavior so determined by these approaches nevertheless deviates substantially from the true electrical behavior due to major structural change by the non-selective introduction of the patch on the floating plane into the simulation or analysis model for the electronic design, especially for lower frequency electronic designs.

In some embodiments, a patch 122B may be determined based in part or in whole upon the size and/or shape of the aperture. In some of these embodiments, the patch may be determined by offsetting the projected boundary segments of the aperture by a margin on the plane where the patch is situated. In some embodiments, the margin may be determined based on the skin effect of alternating currents.

In some other embodiments, the margin may include a predetermined value such as a value that provides 10% projected overlap between the patch and the aperture or 10% of a certain size (e.g., a width of an aperture) in the electronic design. The patch 122B may be placed on a plane 126B that is located at a distance 132B from the metal shape 104B or 106B. The distance 132B may be determined based in part or in whole upon one or more criteria including, for example, a criterion to reduce, minimize, or eliminate resonance or parasitic oscillations.

The patch 122B is placed on the floating plane 126B, rather than the floating plane 130B, because a portion of the metal shape 102B near the cutout 128B may be exposed when viewed from the top and thus may not have a current return path in a model to be solved by a pseudo-3D or hybrid solver. Once which side or which location the patch 122B is determined, the unnecessary floating plane 130B may be removed from consideration.

Figure 2A:
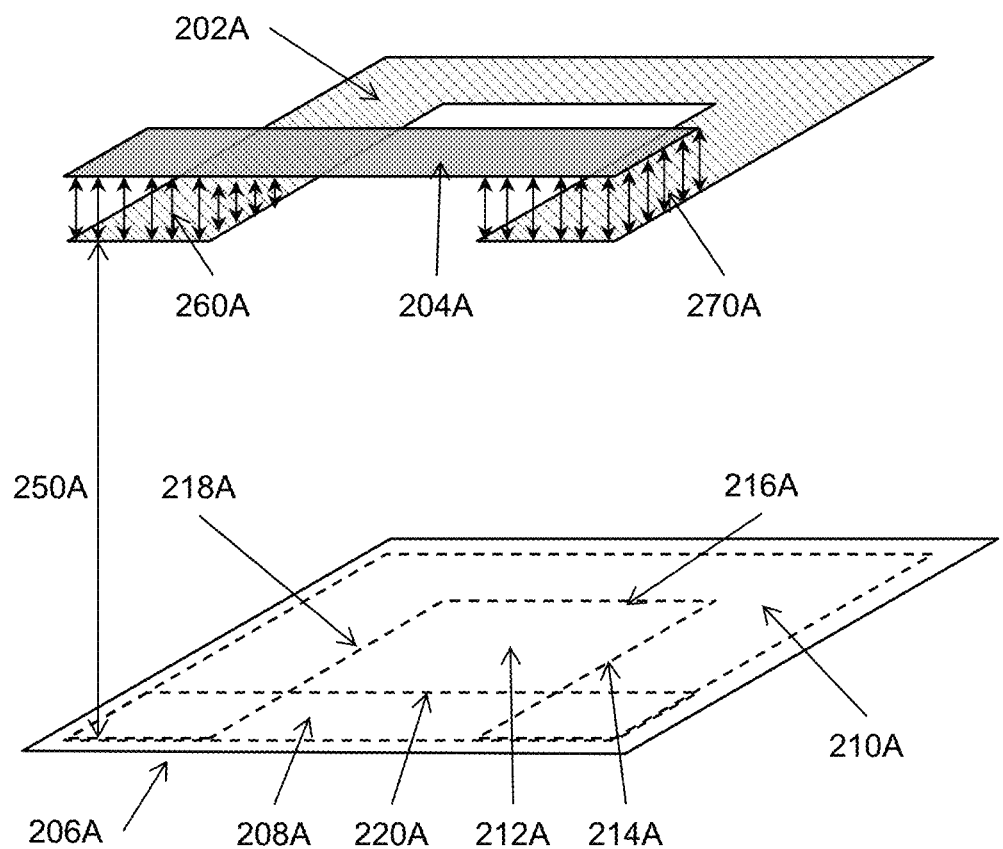
FIG. 2A illustrates a portion of a simplified electronic design that may cause disconnected field domain(s) as well as the application of some techniques described herein in one or more embodiments.
Figure 2B:
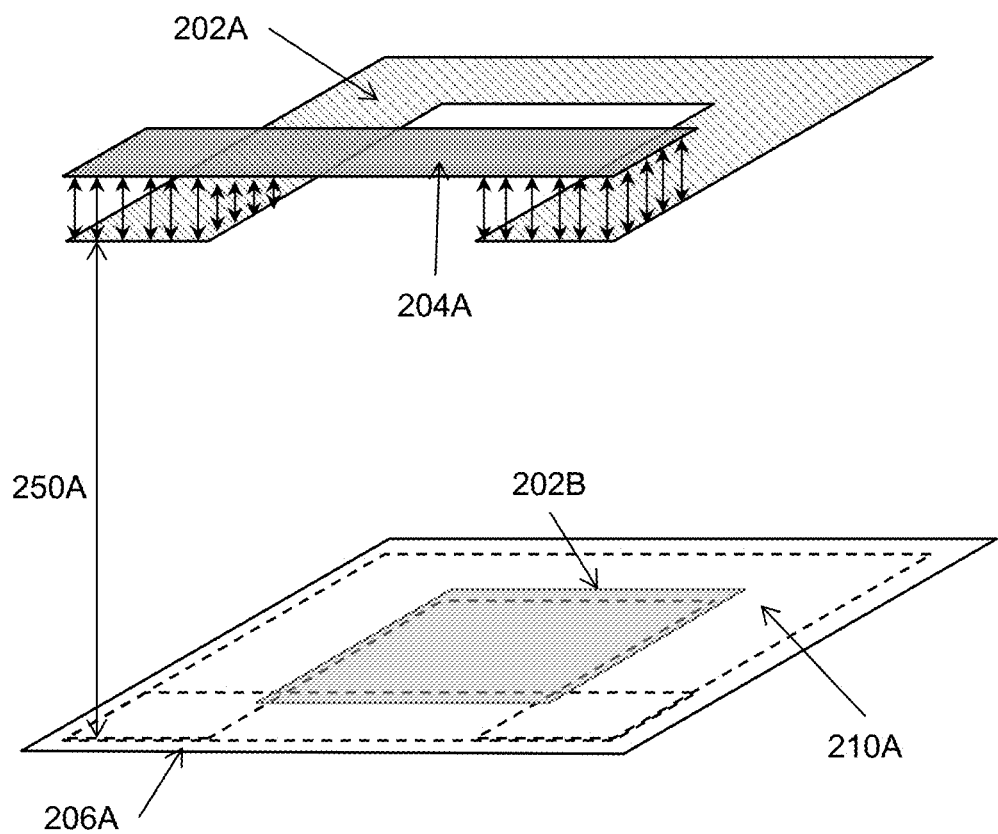
FIG. 2B illustrates projected edges of another simplified electronic design to which various techniques described herein may be applied in one or more embodiments.

FIG. 2A illustrates a portion of a simplified electronic design that may cause disconnected field domain(s) as well as the application of some techniques described herein in one or more embodiments. More specifically, FIG. 2A illustrates a simplified two-layer electronic design in which layer one includes the metal shape 202A, and layer two includes the metal shape 204A. In non-3D solvers, only the parallel field domains 260A and 270A between parallel metal shapes will be modeled and accounted for. In some embodiments, the metal shapes in both layers of the electronic design may be aggregated to form an aggregated view.

The edges of both metal shape 202A and metal shape 204A may be projected onto a plane 206A that is spaced at a distance 250A from the second layer. As it may be seen from FIG. 2A, the edges of metal shape 202A are projected to form the region 210A on the plane 206A, and the edges of metal shape 204A are projected to form the region 208A on the same plane 206A. In some embodiments, the shapes themselves may be projected onto the plane 206A. In these embodiments, metal shape 202A is projected onto plane 2065A to form the region 210A on the plane 206A, and metal shape 204A is projected to form the region 208A on the same plane 206A.

In some embodiments, these metal shapes may be first discretized into a mesh or a plurality of elements by using, for example, a discretization mechanism such as reference numeral 108 of FIG. 1A. The mesh or the plurality of elements indicate which regions are occupied by the mesh or the plurality of elements and thus may be used to determine apertures which constitute unoccupied regions on, for example, the plane 206A for projection.

By using the mesh or the plurality of elements from a design discretization mechanism, it may be determined that region 212A is an unoccupied space because no mesh or elements (or no projected metal shapes) from any of the two layers occupy this particular region 212A. Region 212A is also enclosed by the projected edges 214A, 216A, and 218A from metal shape 202A as well as the projected edge 220A from metal shape 204A. It may then be determined that the electronic design includes an aperture 212A.

In this example illustrated in FIG. 2A, the aperture 212A is enclosed by the projected edges from two different layers in the two-layer electronic design although an aperture may also be enclosed by projected edges from only one layer or more than two layers of different electronic designs. In some embodiments where plane 206A is used only for the identification of apertures, plane 206A may be located at any distance from layer one or layer two so long as the orientation of the plane is along the correct direction of projection.

In these embodiments, the spacing value 250A between plane 206A and a layer (e.g., layer one in this example) is not significant. In some other embodiments where plane 206A may also be used to place the floating plane for patches, the distance 250A may be determined to reduce, minimize, or eliminate disturbances to the original electrical behavior of the electronic design. In some of these embodiments, the distance 250A may be determined based in part or in whole upon one or more criteria including, for example, a criterion to reduce, minimize, or eliminate resonance or parasitic oscillations. Once the apertures are identified, one or more patches may be added to the model for the electronic design as illustrated in FIG. 2B.

FIG. 2B illustrates the introduction of a patch for an identified aperture in the simplified electronic design illustrated in FIG. 2A in one or more embodiments. Once the aperture 212A is identified, a patch may be determined and added to an analysis model representing the simplified electronic design and to be analyzed, simulated, and/or solved. In this example illustrated in FIG. 2B, a patch 202B is inserted at a spacing value of 250A from one of the two layers (layer one in this example).

That is, the patch 202B is inserted on plane 206A in this particular example when the spacing value 250A for plane 206A is determined to reduce, minimize, or eliminate disturbances to the electrical behavior of the original, simplified electronic design. Prior to inserting the patch to the model on a floating plane (plane 206A in this example), the size and/or shape of the patch 202B may be determined. In some embodiments, the patch 202B may be determined by offsetting the projected boundary segments of the aperture 212A by a constant or variable margin on the plane (plane 206A in this example) where the patch 202B is situated.

In this example illustrated in FIG. 2B, the aperture has a quadrilateral shape having four boundary segments (214A, 216A, 218A, and 220A), and the patch 202B may be determined by offsetting these four boundary segments with a constant margin or variable margins. Therefore, the four boundary segments need not be offset by the same margin. In some embodiments, the margin may be determined based on the skin effect of alternating currents. In some other embodiments, the margin may include one or more predetermined values such as a value that provides 10% projected overlap between the patch 202B and the aperture 212A or 10% of a certain size (e.g., a width of an aperture) in the electronic design. In some embodiments, the margin may be determined heuristically, statistically, theoretically, or experimentally.

For example, the margin may be determined based on prior design data. In addition or in the alternative, the margin (whether a constant margin or variable margins) may depend on the operating frequency of an electronic design. For example, a patch for an aperture in an electronic design with a higher operating frequency may be determined from the aperture and a smaller margin than a patch for an identical or substantially similar aperture in an electronic design having a lower operating frequency.

Figure 2C:
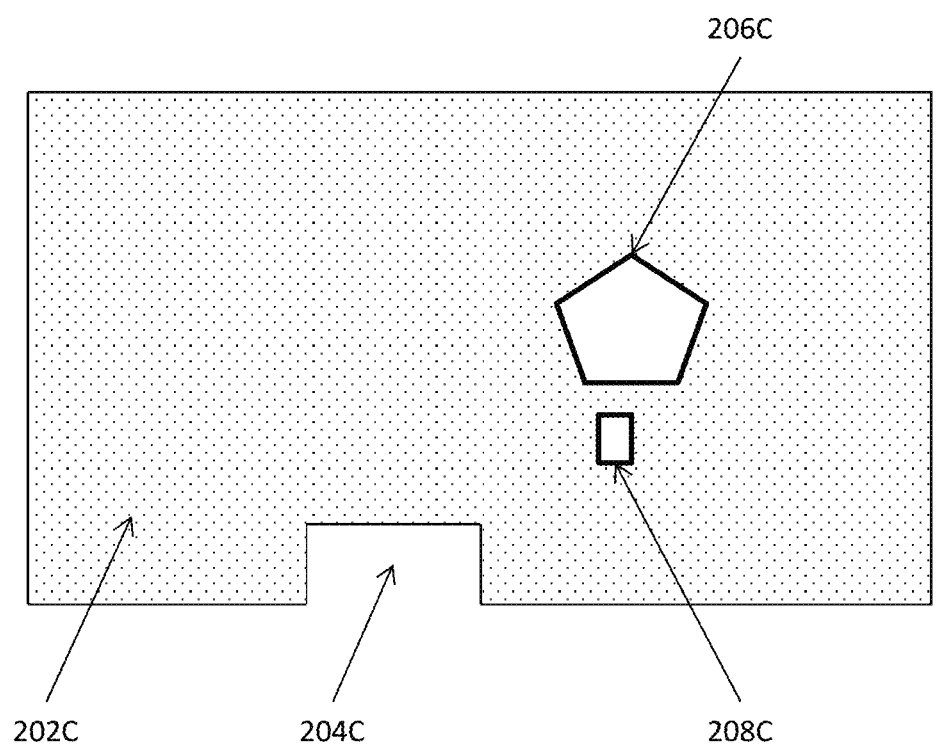
FIG. 2C illustrates projected edges or shapes of another simplified electronic design to which various techniques described herein may be applied in one or more embodiments.

FIG. 2C illustrates projected edges or shapes of another simplified electronic design to which various techniques described herein may be applied in one or more embodiments. In FIG. 2C, the textured area 202C is determined to be occupied by various shapes on one or more layers of the simplified electronic design. It is determined that the simplified electronic design includes aperture 206C and 208C that may cause disconnected field domains which may further lead to inaccurate electrical behavior with a hybrid solver.

Figure 2D:
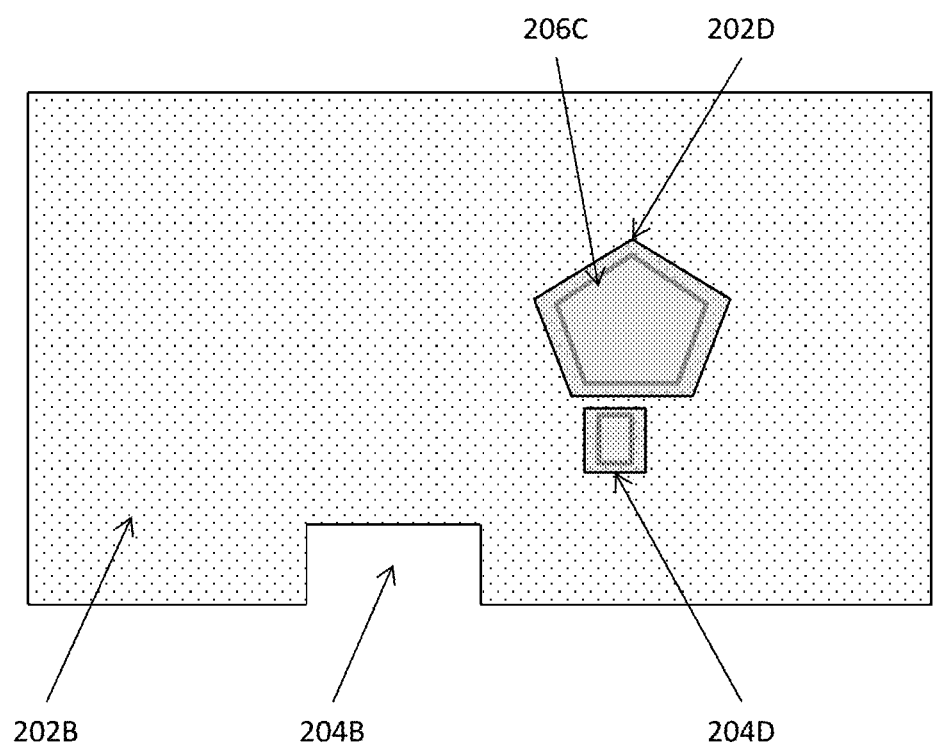
FIG. 2D illustrates an example of introducing a patch onto a floating plane for an identified aperture in one or more embodiments.

It shall be noted that the five boundary segments of the aperture 206C may be obtained from shapes in a single layer or in multiple layers. Similarly, the four boundary segments of the aperture 208C may also be obtained from shapes in a single layer or in multiple layers. FIG. 2C also includes a notch 204C which is not recognized as an aperture because notch 204C is not fully enclosed. FIG. 2D illustrates the introduction of a first patch 202D on a floating plane (not shown in this 2D view) for the identified aperture 206C, and a second patch 204D on the same floating plane or a different floating plane (neither is shown in this 2D view) for the identified aperture 208C.

Figure 2E:
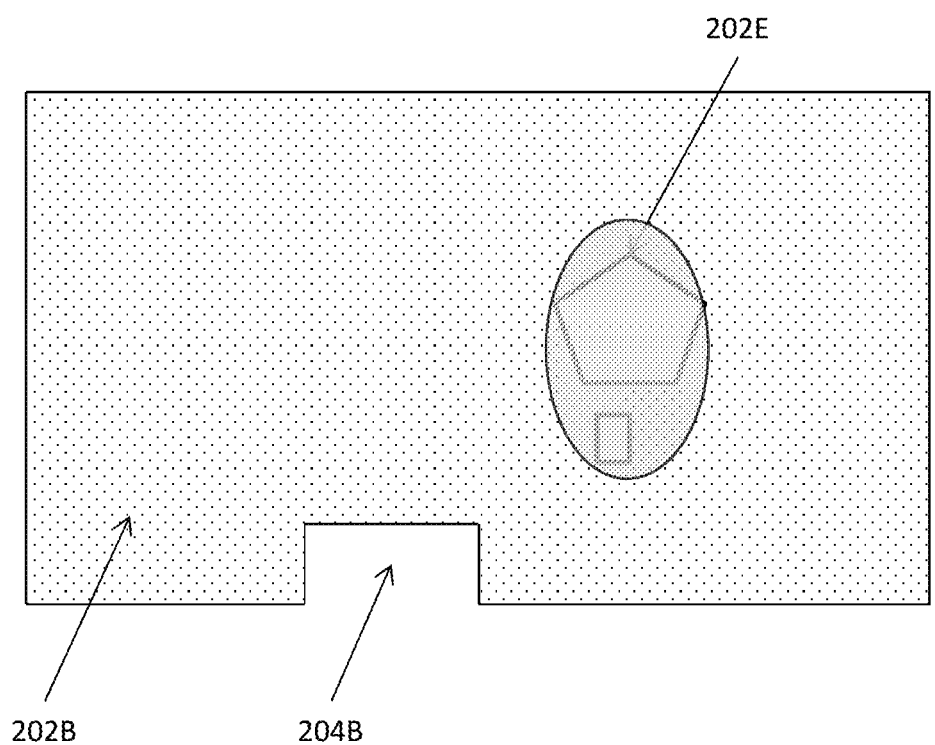
FIG. 2E illustrates another example of introducing a patch onto a floating plane for an identified aperture in one or more embodiments.

As previously described, the shape of the patch 202D may be determined by offsetting the boundary segments of the aperture 206C by a constant margin or variable margins. The shape of the aperture 204D may be similarly determined by offsetting the boundary segments of the aperture 208C by a constant margin or variable margins. FIG. 2E illustrates the introduction of a single patch 202E on a floating plane (not shown in this 2D view) for the identified apertures 206C and 208C. In this example, an elliptical patch 202E is added to a floating plane in the model for the simplified electronic design. In some embodiments, the patch 202E may have other shape or form such as a quadrilateral shape or a circular shape.

Figure 3A:
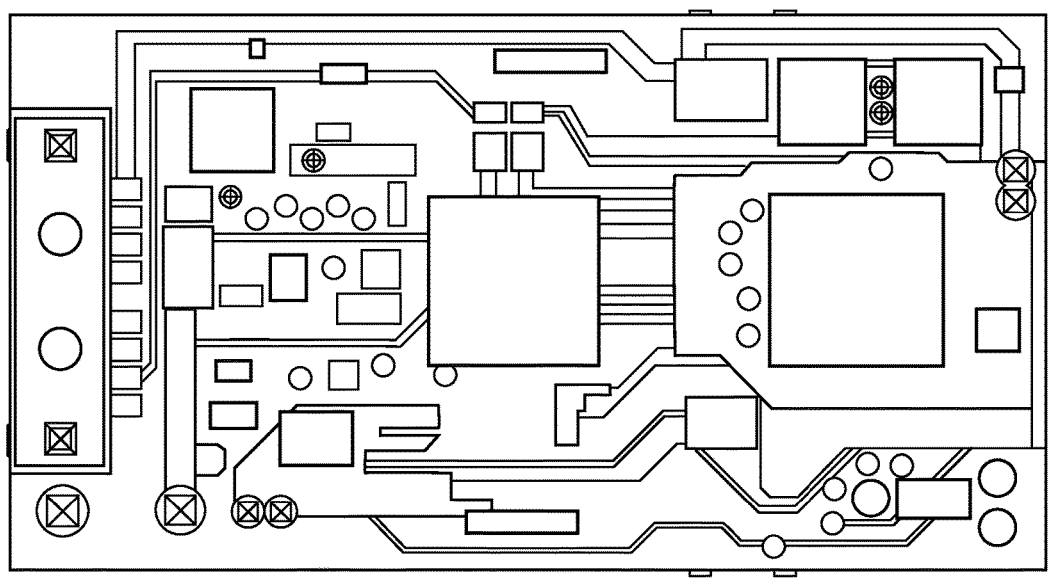
FIG. 3A illustrates a view of a more complex electronic design to which various techniques described herein may be applied in one or more embodiments.
Figure 3B:
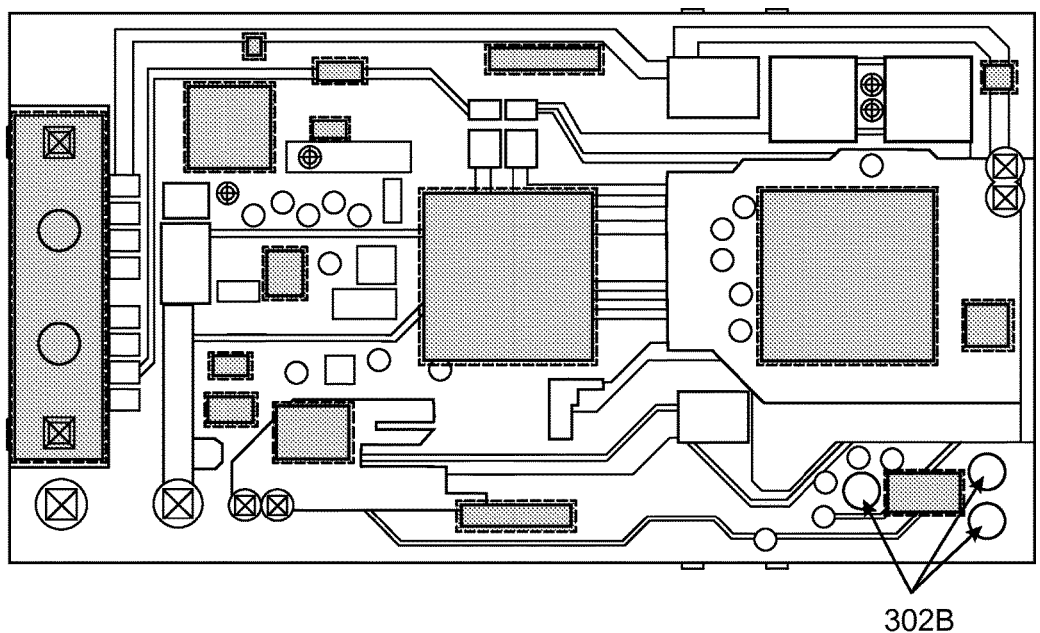
FIG. 3B illustrates an example of apertures causing disconnected field domains in the more complex electronic design illustrated in FIG. 3A in one or more embodiments.
Figure 3C:
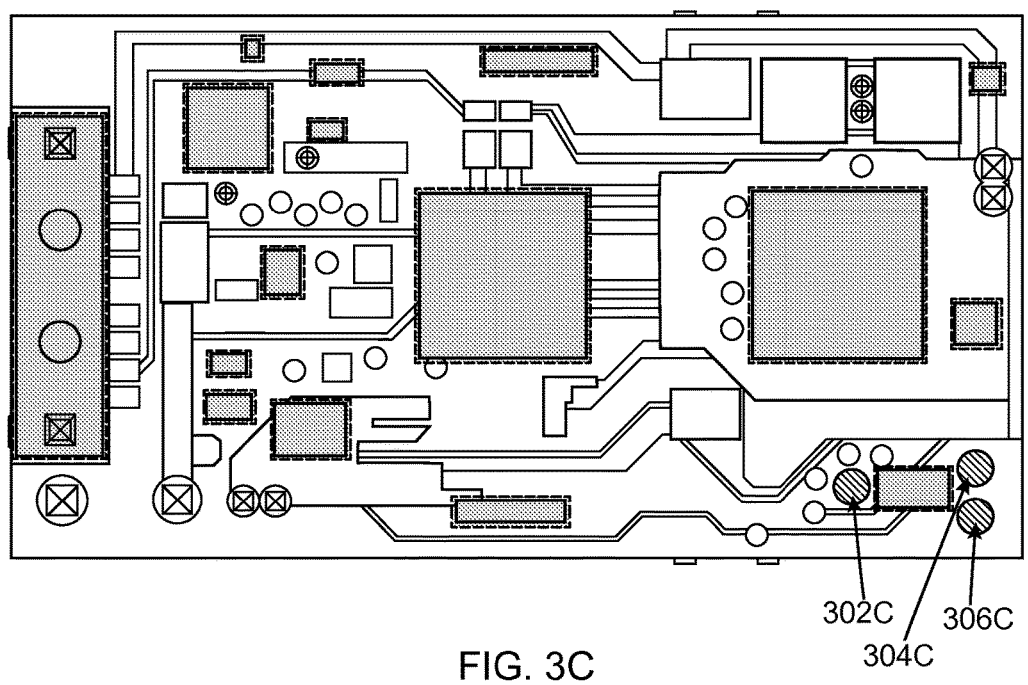
FIG. 3C illustrates the application of some techniques to the more complex electronic design illustrated in FIG. 3A to handle the disconnected field domains for analyzing or simulating the more complex electronic design in one or more embodiments.

FIG. 3A illustrates a view of a more complex electronic design to which various techniques described herein may be applied in one or more embodiments. FIG. 3B illustrates identification of three apertures (302B) that may cause disconnected field domains in the more complex electronic design illustrated in FIG. 3A in one or more embodiments. FIG. 3C illustrates the application of some techniques to the more complex electronic design illustrated in FIG. 3A to handle the disconnected field domains for analyzing or simulating the more complex electronic design in one or more embodiments.

Figure 3D:
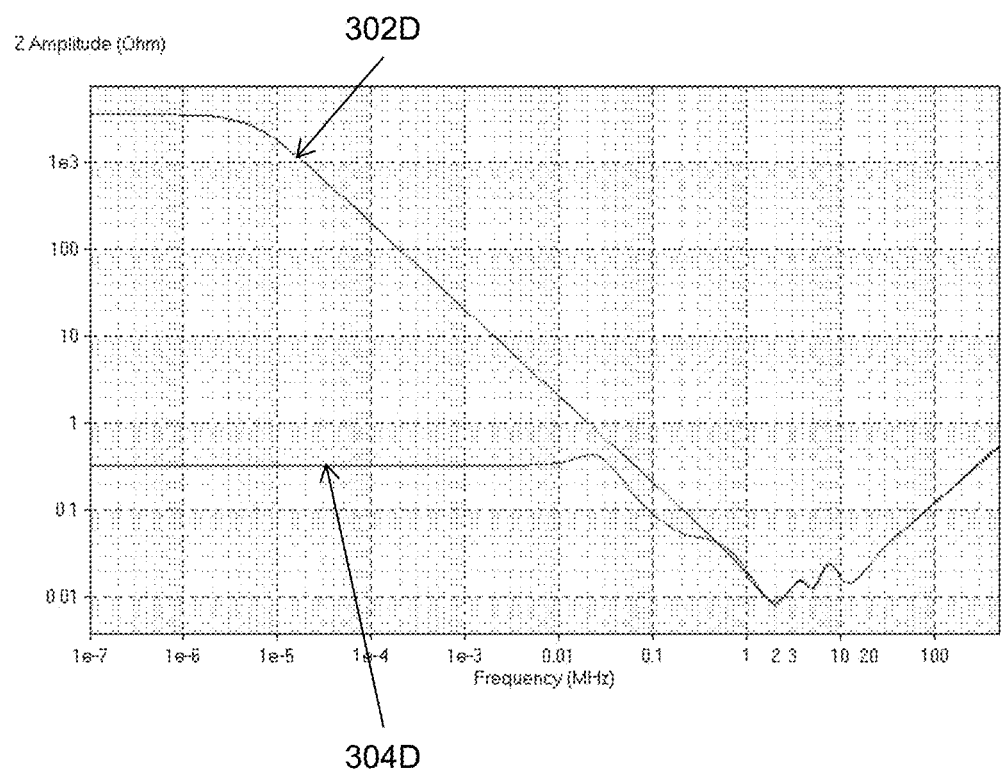
FIG. 3D illustrates an example of some analysis or simulation results of analyzing or simulating an electronic circuit design with the techniques for handing disconnected field domains in one or more embodiments.

More specifically, FIG. 3C illustrates the introduction of three patches 302C, 304C, and 306C to the three apertures 302B in FIG. 3B. FIG. 3D illustrates an example of some analysis or simulation results of analyzing or simulating an electronic circuit design with the techniques for handing disconnected field domains in one or more embodiments. Curve 302D illustrates the simulated electrical behavior (Z amplitude) of an electronic circuit design over a range of frequencies (e.g., from $1.0 \times 10^{-7}$ MHz through over 100 MHz).

Curve 302D is obtained with a solver on a model without applying various techniques to the model representing the electronic design under test in the solver. Curve 304D is obtained with the same solver on the model with the application of various techniques to the model representing the electronic design under test in the solver. Curve 304D illustrates more accurate simulated electrical behavior (Z amplitude) of the electronic circuit design over the same range of frequencies (e.g., from $1.0 \times 10^{-7}$ MHz through over 100 MHz). As it can be seen from FIG. 3D, these two curves deviate more substantially in lower frequencies.

Figure 4:
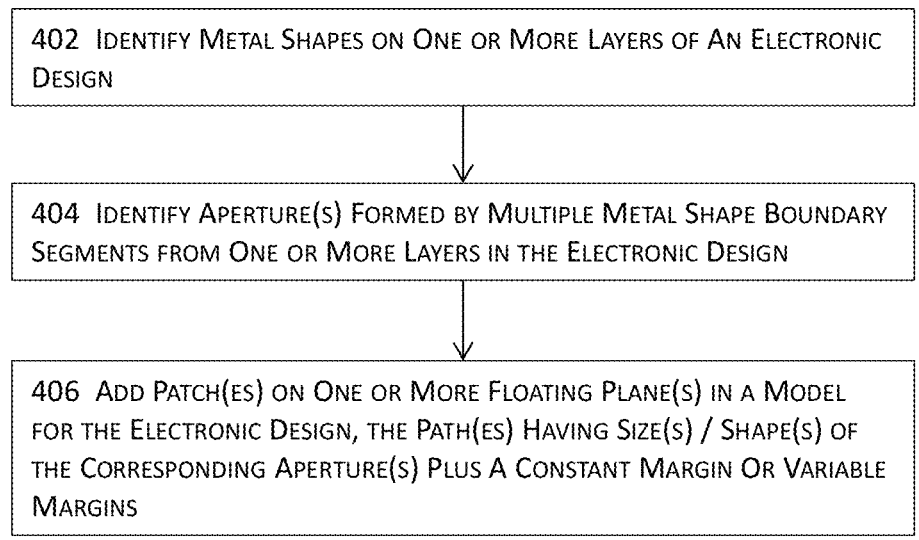
FIG. 4 illustrates a high level block diagram for implementing or devising an electronic design with disconnected field domains in one or more embodiments.

FIG. 4 illustrates a high level block diagram for implementing or devising an electronic design with disconnected field domains in one or more embodiments. Metal shapes on one or more layers may be identified at 402. In some embodiments, all of the metal shapes may be identified. In addition or in the alternative, polysilicon or other electrically conductive shapes are also identified and used in subsequent determination of apertures and patches.

In some embodiments, the metal shapes may be aggregated into an aggregated view which may comprise, for example, a flattened design space including all metal shapes in the electronic design. In this disclosure, metal shapes, polysilicon shapes, and other electrically conductive shapes may be collectively referred to as metal shapes. In some embodiments, metal shapes identified for subsequent aperture determination and patch determination do not include wires, interconnects, and traces although these circuit design components are also made of metal.

The identified metal shapes may also be discretized into a mesh or a plurality of elements in some embodiments by using a mesh generator such as the discretization mechanism 108. In these embodiments, each identified metal shape may be discretized into one or more elements. The generated mesh may be subsequently used to determine whether certain space is occupied by a metal shape in some of these embodiments, although other methods may also be used to determine the same.

For example, an electronic design (e.g., a layout) may be traversed to identify metal shapes. Boolean OR operations may be performed on the identified metal shapes in a batch mode or as these metal shapes are identified. The resulting product of the Boolean OR operations represents the portion of the design space that is occupied by at least one metal shape. At 404, one or more apertures may be identified. An aperture includes a region that is fully enclosed by a plurality of boundary segments, and each boundary segment may represent a boundary segment of a metal shape or a portion thereof.

The plurality of boundary segments need not come from metal shapes on a single layer. Rather, the plurality of boundary segments may come from multiple metal shapes on multiple layers in the electronic design. In the example illustrated in FIG. 2A, the aperture 212A is fully enclosed by four boundary segments, and three (218A, 216A, and 214A) of the four boundary segments come from the boundary segments of shape 202A while the other boundary segment (220A) comes from the boundary segment of shape 204A. In some embodiments, these one or more apertures may be identified by projecting the identified metal shapes or the plurality of elements generated by a discretization mechanism for the identified metal shapes onto a plane. Any region that is fully enclosed but not occupied by at a metal shape or one or more elements may be determined to be an aperture.

One or more patches may be added on one or more floating planes in a model representing the electronic design at 406. A floating plane is parallel to the layers of the electronic design and is thus also parallel to the plane onto which metal shapes or a plurality of elements are projected to determine apertures. In some embodiments, only one floating plane is added to either the top side or the bottom side of the electronic design. The side of the electronic design to which a floating plane may be added may be determined by comparing the areas of metal shapes that are exposed to open space.

If more area of metal shapes is open to open space when viewed from the top side of the electronic design a floating plane may be added to the top side of the electronic design. Conversely, if more area of metal shapes is open to open space when viewed from the bottom side of the electronic design a floating plane may be added to the bottom side of the electronic design. In some embodiments, an area of metal shape or metal shapes is determined to be open to open space when the area is situated outside parallel field domains and causes disconnected field domains.

In the example described with reference to FIG. 2A, the floating plane may be added to the bottom side of metal shapes 202A and 204A because the area 208A is situated outside two parallel field domains and causes these two parallel field domains (260A and 270A) to be disconnected. When the simplified electronic design in FIG. 2A is viewed from the top side, each of metal shapes 202A and 204A constitutes a single, connected metal shape. The floating plane may therefore be added to the bottom side of the simplified electronic design illustrated in FIG. 2A.

In some embodiments, floating planes may be added to both the top side and the bottom side of the electronic design. In some of these embodiments, it may be further determined which side results in more area of metal shapes exposed to open space, and the floating plane will be finally determined to be on the side from which more area of metal shapes is exposed to open space. The other floating plane may then be discarded. In some of these embodiments, both floating planes may be retained if the difference in the metal shape areas exposed to open space and/or causing disconnected field domains from both sides fall within a predetermined threshold (e.g., 20%).

An individual sub-area exposed to open space may be optionally ignored from the aforementioned determination if the individual sub-area is smaller than or equal to a predetermined value. In some embodiments, the area of metal shapes exposed to open space may be determined by using the mesh or the plurality of elements determined by a discretization mechanism. The addition of a floating plane and subsequent addition of one or more patches into a model of an electronic design may introduce artificial electrical behavior (e.g., artificial electromagnetic field, artificial resonance, etc.) that is not a natural result of the interactions between actual electronic circuit component designs.

A floating plane may be positioned at a distance from the closest layer such that the addition of the patches on the floating plane exhibits reduced or minimal disturbances (e.g., artificial resonance or parasitic oscillations due to the introduction of the floating plane, coupling between the artificial resonance and actual field domain(s), etc.) to the electrical behavior or characteristics of at least the circuit components on the closest layer of the electronic design in some embodiments. In these embodiments, the disturbance to the electrical behavior or characteristics of the remaining layers are further reduced because these remaining layers are further apart from the floating plane.

A patch may be determined and added to the floating plane to cover an identified aperture. The addition of a patch on a floating plane to the model introduces an artificial boundary for the aperture and provides one or more artificial return paths for the current flow. The size and/or shape of a patch may be determined for an aperture. In some embodiments, the size and/or shape of a patch may be determined based in part or in whole upon the size and/or shape of the aperture. In some of these embodiments, the patch may be determined by offsetting the projected boundary segments of the aperture by a margin on the plane where the patch is situated.

In some embodiments, the margin may be determined based on the skin effect of alternating currents. In some other embodiments, the margin may include a predetermined value such as a value that provides 10% projected overlap between the patch and the aperture or 10% of a certain size (e.g., a width of an aperture) in the electronic design. In some embodiments, the size and/or shape of a patch may be determined based further in part or in whole upon whether there exist one or more additional apertures within a halo of a predetermined distance.

For example, the size or shape of a patch for an aperture may be modified to accommodate these one or more additional apertures If it is determined that these one or more additional apertures are within a halo of a predetermined size surrounding the aperture. In some embodiments, whether or not a patch is to encompass multiple apertures may be determined based in part or in whole upon the close proximity of multiple patches and the constant margin or variable margins of a patch if these multiple apertures are to be separately covered by these multiple patches.

For example, if two patches with their respective margins for two separate apertures are determined to be within some close proximity from each other, one of the two patches may be augmented or these two patches may be merged to cover both apertures. These one or more patches may then be added to a model representing the electronic design under test and provided to a non-3D solver to analyze or simulate the electrical behavior of the electronic design.

Figure 5A:
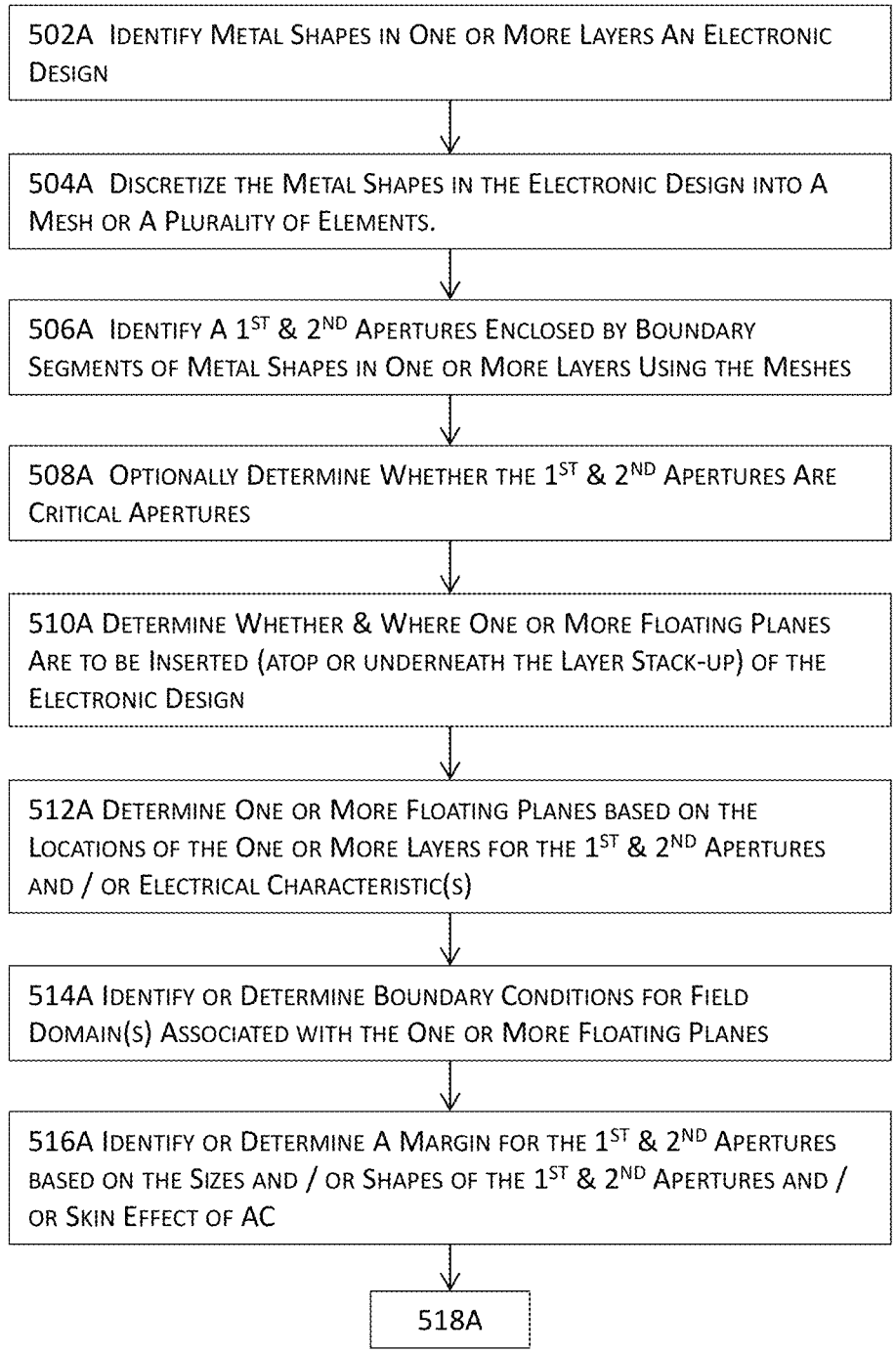
FIGS. 5A-B jointly illustrate a more detailed block diagram for implementing or devising an electronic design with disconnected field domains in one or more embodiments.
Figure 5B:
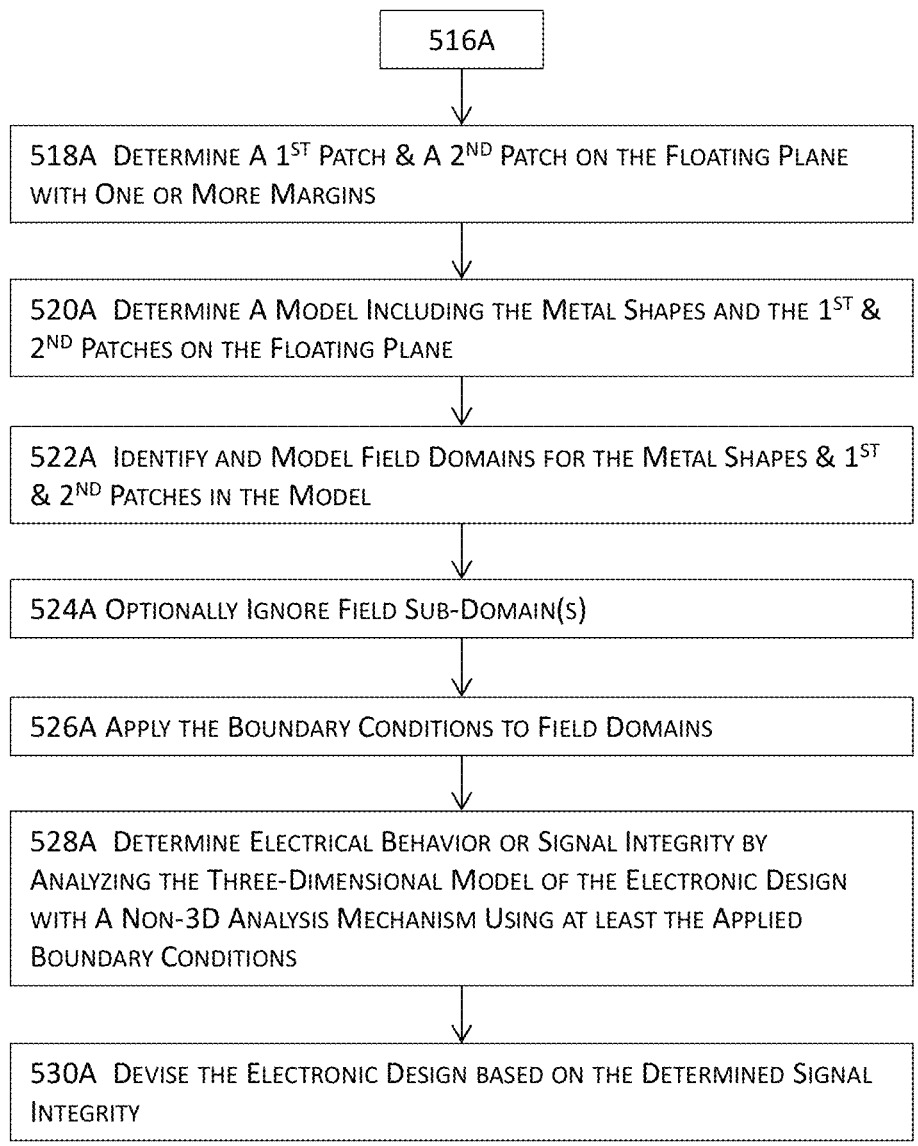

FIGS. 5A-B jointly illustrate a more detailed block diagram for implementing or devising an electronic design with disconnected field domains in one or more embodiments. Metal shapes in an electronic design may be identified at 502A. The electronic design may include one or more layers, and metal shapes in these one or more layers may be identified at 502A. In some embodiments, all metal shapes in the electronic design may be identified at 502A.

In addition or in the alternative, polysilicon shapes are also identified and used in subsequent determination of apertures and patches. In some of these embodiments, wires, interconnects, and traces may be included in the identification process at 502A. In some other embodiments, wires, interconnects, and traces may not be included in the identification process at 502A. Rather, only polygonal shapes of circuit component designs are identified at 502A. In some of these immediately preceding embodiments, traces may be modeled in separate model and thus need not be accounted for in the model including floating plane(s) and patch(es).

It shall be noted that metal shapes, polysilicon shapes, and other electrically conductive shapes may be collectively referred to as metal shapes in this disclosure as described previously with reference to FIG. 4. In some embodiments, metal shapes identified at 502A may include internal patches (if existing) on signal planes between two layers in the electronic design and/or external patches (if existing) on the top mounting plane, the bottom mounting plane, or both the top and the bottom mounting planes.

The identified metal shapes may be discretized at 504A into a mesh or a plurality of elements. The identified metal shapes may also be discretized into a mesh or a plurality of elements in some embodiments by using a mesh generator such as the discretization mechanism 108 in FIG. 1A. A first aperture and a second aperture may be identified at 506A with the mesh or the plurality of elements. An aperture is fully enclosed by boundary segments of metal shapes on the same layer or on different layers of the electronic design. Therefore, an aperture is not necessarily an actual unoccupied space unless all boundary segments enclosing the aperture exist on the same layer.

In the example illustrated in FIG. 2A, the aperture 212A is fully enclosed by three boundary segments (214A, 216A, and 218A) on one layer and the boundary segment 220A on the other layer and is thus not defined by any single layer. Rather, it is the four boundary segments on these two layers that collectively form the aperture 212A. As described above with reference to FIG. 4, the generated mesh may be subsequently used to determine whether certain space is occupied by a metal shape in some of these embodiments, although other methods may also be used to determine the same. In some embodiments, the size and/or the shape of an aperture may also be determined at 506A. The size or the shape of an aperture may be subsequently used to determine the size or shape of a patch.

It may be further determined at 508A whether the first aperture and/or the second aperture is a critical aperture. A critical aperture includes one that may cause a predetermined degree of impact on the electrical behavior of an electronic design if a corresponding patch is not introduced into the model representing the electronic design. In some embodiments, all critical apertures will be associated with their corresponding patches on one or more floating planes, whereas non-critical apertures need not be associated with patches.

In some other embodiments, all apertures, regardless of their criticality, will be associated with their corresponding patches in the model representing the underlying electronic design under test. Criticality of an aperture may vary with respect to the source of the signal(s) flowing through the metal shapes whose boundary segments contributing to the formation of the aperture, the load on these metal shapes, or a combination of the source of the signal(s) and the load.

At 510A, it may be determined whether one or more floating planes are to be inserted, and where the one or more floating planes are to be inserted. For example, it may be determine whether the floating plane atop and the floating plane underneath the layer stack-up of an electronic design are needed. Needed floating plane(s) will be added to the model representing the electronic design, while the unnecessary floating plane will be discarded. As presented above, a floating plane may be added to the top side, and the other floating plane may be added to the bottom side of the electronic design in some embodiments.

In some of these embodiments, the area of metal shapes exposed to open space may be determined for both the top side and the bottom side. A floating plane may then be determined to be on the side from which more metal shape area outside parallel field domains is exposed to open space. The other floating plane may then be discarded. In some of these embodiments, both floating planes may be retained if the difference in the metal shape areas exposed to open space and/or causing disconnected field domains from both sides fall within a predetermined threshold (e.g., 10%).

An individual sub-area exposed to open space and/or causing disconnected field domains may be optionally ignored from the aforementioned determination if the individual sub-area is smaller than or equal to a predetermined value. In some embodiments, the area of metal shapes exposed to open space may be determined by using the mesh or the plurality of elements determined by a discretization mechanism although it is contemplated that other methods may also be used to obtain the same.

The addition of patches on a floating plane may introduce artificial resonance or parasitic oscillations due to the overlapping margins and hence the additional electromagnetic field domains created between, for example, a patch and the overlapping metal shapes. The location of a floating plane may thus be determined based in part or in whole upon one or more criteria including, for example, a criterion to reduce, minimize, or eliminate artificial resonance, parasitic oscillations, or any other artificial effects on the original electrical behavior of the electronic design under test.

For example, a floating plane may be positioned so that the floating plane and the closest layer are spaced apart at a distance to reduce, minimize, or eliminate such artificial resonance, parasitic oscillations, or any other artificial effects. Any additional layer is spaced further away from the floating plane thus positioned, and the patches on the floating planes will therefore exert less influence over the electrical behavior of the electronic design components on this additional layer. In some embodiments, some electromagnetic field domains involving the floating plane(s) may be trimmed or removed.

In some of these embodiments, electromagnetic field domains between two floating planes will be removed. In these embodiments, the portions of floating planes with no intervening electronic circuit component designs will be trimmed or removed such that no electromagnetic field domains will be modeled between these two floating planes. This is demonstrated in FIG. 1C where floating plane 126B as represented by 124B is now trimmed to become the smaller floating plane represented by 102C, and floating plane 130B is also trimmed to become floating plane 104C. With the location of the floating plane and the sizes and/or shapes of patches determined, these patches may be added to a model that also includes the underlying electronic design.

Boundary conditions may be identified or determined at 514A for the electromagnetic field domains to be solved by a non-3D solver for the model. A boundary condition indicates how an electromagnetic field solver treats a boundary segment or a plurality of boundary segments in a model for an electronic design. When electromagnetic wave propagates to the boundary, some of the electromagnetic waves reflect back, some of the incident electromagnetic waves are absorbed by the boundary, while some other continues to radiate to the external environment.

In some embodiments, boundary conditions may include, for example, one or more natural boundary conditions, one or more absorbing boundary conditions, or a combination of one or more natural boundary conditions and one or more absorbing boundary conditions. A natural boundary condition considers the reflection on boundary segments that are connected to the external environment (e.g., atmosphere). An absorbing boundary condition considers the absorption of the incident electromagnetic waves by a boundary segment to which the absorbing boundary condition is applied.

A margin may be identified or determined at 516A for the first aperture and the second aperture in some embodiments. In some embodiment, a margin for an aperture may be determined based in part or in whole upon the size and/or the shape of the aperture. A margin is used to augment the boundary of an aperture to form the shape for a patch for the aperture. A margin may include a constant margin or a variable margin.

With a constant margin, the shape of a patch for an aperture may be determined by offsetting the shape of the aperture by the constant margin. With a variable margin, the shape of a patch for an aperture may be determined by offsetting the boundary segments of an aperture with two or more margin values or a margin value determined from an n-th order polynomial where n is a positive integer. A margin may be a predetermined value (e.g., an offset distance, a percentage of a certain size such as a length or width of an aperture, etc.) or may be determined based in part or in whole upon one or more factors including, for example, the skin effect of alternating currents.

A first patch for the first aperture and a second patch for the second aperture may be determined at 518A. A patch is placed on a floating plane and is thus floating. In some embodiments, the first and second patches may be determined with the same margin by offsetting the boundaries of the first aperture and the second aperture to determine the respective shapes of the first and second patches. In some other embodiments, the first patch and the second patch may be determined with two different constant or variable margins.

A model may be determined and constructed at 520A to include the metal shapes, the first and second patches determined at 518A, and the one or more floating planes determined at 512A. Field domains between a set of parallel metal shapes and patches may be identified and modeled at 522A. One or more field domains modeled at 522A may be optionally ignored at 524A. These one or more field domains may be referred to as negligible electromagnetic field domains or simply negligible field domains. For example, an electromagnetic field domain between two floating planes may be ignored and removed from the model in some embodiments. In addition or in the alternative, an electromagnetic field domain involving an unnecessary floating plane may also be ignored and removed from the model.

Boundary conditions identified or determined at 514A may be applied to the electromagnetic field domains at 526A. In the example illustrated in FIG. 1C, regions 108C and 106C are modeled as two separate electromagnetic field domains (e.g., 106C being a cylindrical field domain, and 108C being a hollow cylindrical field domain). Natural boundary conditions may be applied to the boundaries 112C and 110C assuming that these two boundaries are open to the atmosphere.

A natural boundary condition may be imposed on one or more boundary segments for the electromagnetic field solver to determine how much of the incident electromagnetic wave is reflected back and how much continues to radiate. In some embodiments, boundary conditions may be applied to one or more electromagnetic field domains based in part or in part upon the operating frequency of the underlying electronic design. For example, natural boundary conditions may be preferred over applied to one or more electromagnetic field domains in a model of an electronic design having a lower operating frequency.

At 528A, the electromagnetic field domains may be solved by providing the model as an input to a non-3D electromagnetic field solver which in turn analyzes or simulates the model with the imposed boundary conditions to determine various electrical characteristics of the underlying electronic design by solving for the electromagnetic field domains. Analysis or simulation results including, for example, the electrical behavior, signal integrity, etc. of the underlying electronic circuit design may be determined based in part or in whole upon the electromagnetic field domains solved at 528A. The electronic design may be devised at 530A based in part or in whole upon the analysis or simulation results determined at 528A.

In an analysis mechanism or simulator including one or more hybrid solvers, three-dimensional fields (e.g., three-dimensional electromagnetic fields) in a complex three-dimensional electronic design may be decomposed into a plurality of models such as the analysis model constructed with various techniques described herein. Each model may be simulated or analyzed with one or more corresponding solvers that operate upon the model to generate equally or approximately accurate analysis or simulation results as those obtained with three-dimensional solvers, without using three-dimensional solvers. These non-3D solvers include, for example, an electromagnetic filed solver, a circuit solver, a plane solver, a transmission line solver, or any combinations thereof, etc. utilizing various numerical techniques (e.g., finite element methods, finite difference time-domain methods, boundary element methods, etc.) that are deemed appropriate. The analysis mechanism or simulator may, of course, include a 3D-solver to solve 3D models in some embodiments.

In addition to the analysis models constructed with various techniques described herein, the analysis mechanism for complex 3D electronic designs may also include various other models for correctly modeling and solving complex electronic designs. These additional models may include one or more of, for example, s-parameter models, transmission line models, plane and medium models including plane and medium parameters, or any combinations thereof. These non-3D solvers operating on and solving models of an electronic design without resorting to 3D solvers not only conserve computation resources in terms of computation cycles and memory footprint but also enhance performance of the overall analysis mechanism. Some numerical experiments have evidenced over 1000-times gain in simulation or analysis speed.

Figure 6:
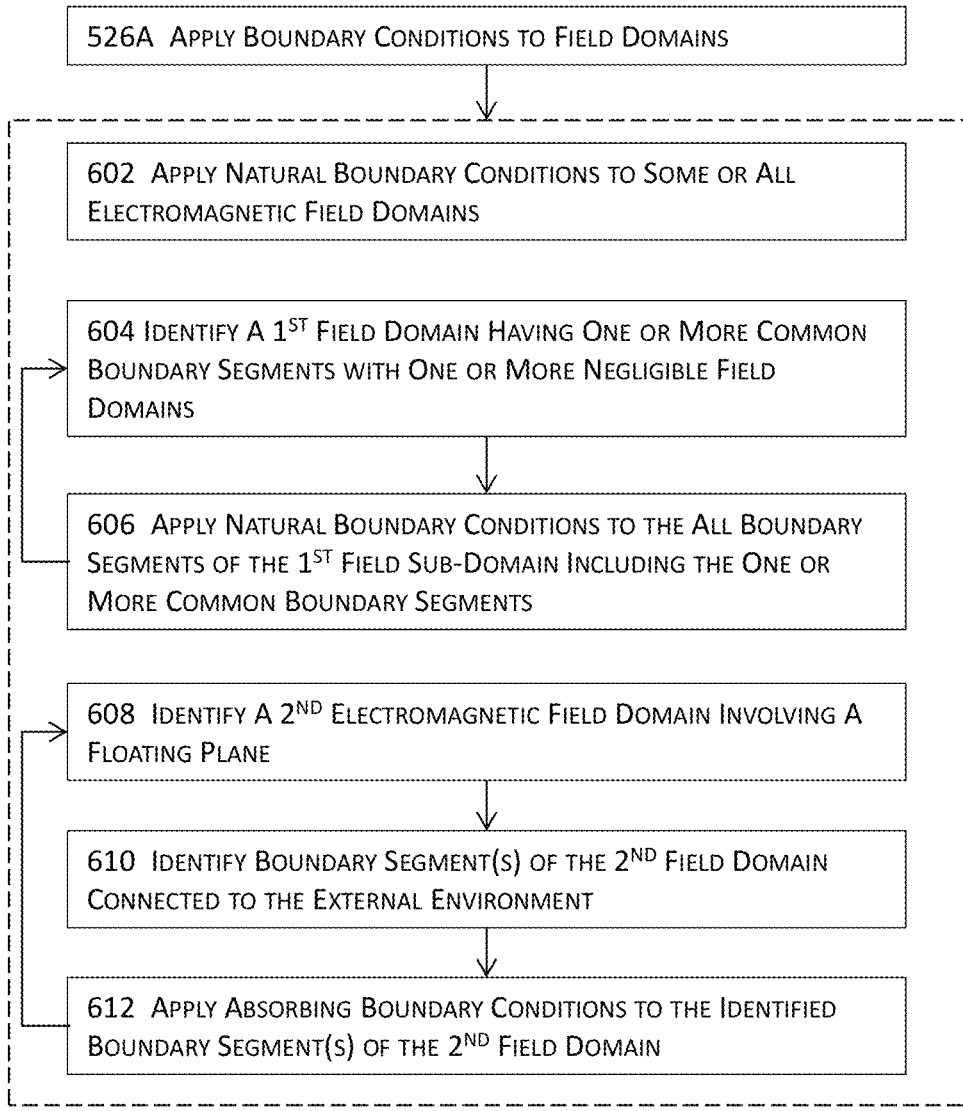
FIG. 6 illustrates more details for an act in the block diagram for implementing or devising an electronic design with disconnected field domains illustrated in FIGS. 5A-B in one or more embodiments.

FIG. 6 illustrates more details for an act in the block diagram for implementing or devising an electronic design with disconnected field domains illustrated in FIGS. 5A-B in one or more embodiments. More specifically, FIG. 6 illustrates more details about the act of applying boundary conditions to an electromagnetic field domain in one or more embodiments. Applying boundary conditions to an electromagnetic field domain may include applying one or more natural boundary conditions to some or all boundary segments of electromagnetic boundary segments of electromagnetic field domains connected to the external environment at 602 in some embodiments.

In these embodiments, absorbing boundary conditions are not applied to the boundary segments of electromagnetic field domains connected to the external environment. Applying boundary conditions to an electromagnetic field domain may include identifying a first electromagnetic field domain sharing one or more common boundary segments with one or more negligible field domains at 604. Negligible field domains include electromagnetic field domains between floating planes or electromagnetic field domains involving an unnecessary floating plane in some embodiments.

Natural boundary conditions may then be applied at 606 to one or more boundary segments, which are connected to the external environment, of the identified electromagnetic field domain. In some of these embodiments, the process may return to 604 to identify all the remaining electromagnetic field domains sharing one or more common boundary segments with at least one negligible electromagnetic field domains and apply natural boundary conditions to these one or more common boundary segments.

In addition or in the alternative, a second electromagnetic field domain that involves a floating plane may be identified at 608 in some embodiments. One or more boundary segments, which are connected to an external environment, of the second electromagnetic field domain may be identified at 610; and absorbing boundary conditions may be applied to the one or more identified boundary segments at 612. In some of these embodiments, the process may return to 608 to identify the remaining electromagnetic field domains involving a floating plane, identify boundary segments connected to an external environment, and apply absorbing boundary conditions to these identified boundary segments.

System Architecture Overview

Figure 7:
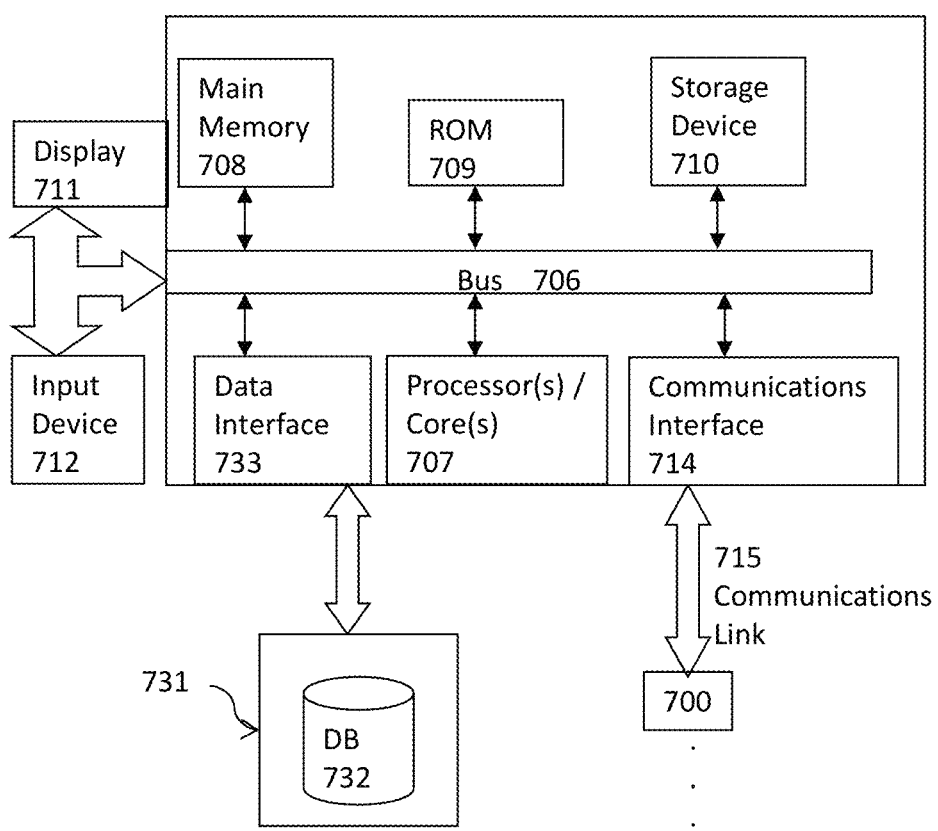
FIG. 7 illustrates a computerized system on which a method for implementing or devising an electronic design with disconnected field domains may be implemented.

FIG. 7 illustrates a block diagram of an illustrative computing system 700 suitable for constructing a simulation schematic of an electronic design across multiple design fabrics as described in the preceding paragraphs with reference to various figures. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control (not shown).

According to one embodiment, computing system 700 performs specific operations by one or more processor or processor cores 707 executing one or more sequences of one or more instructions contained in system memory 708. Such instructions may be read into system memory 708 from another computer readable/usable storage medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707, where the one or more processors, one or more processor cores, or combination thereof executes one or more threads. For example, various identifications, determinations, discretization, application of boundary conditions, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of apertures, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. In an embodiment, the computing system 700 operates in conjunction with a data storage system 731, e.g., a data storage system 731 that includes a database 732 that is readily accessible by the computing system 700. The computing system 700 communicates with the data storage system 731 through a data interface 733. A data interface 733, which is coupled with the bus 706, transmits and receives electrical, electromagnetic or optical signals that include data streams representing various types of signal information, e.g., instructions, messages and data. In embodiments of the invention, the functions of the data interface 733 may be performed by the communication interface 714.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for devising an electronic design with disconnected field domains, comprising:
   identifying a plurality of metal shapes of an electronic design;
   reducing computational resource consumption by representing at least a portion of the electronic design with an additional model in a model for the electronic design;
   adding, at a patching module including or coupled with at least one micro-processor of a computing system, a plurality of patches to the model for the electronic design for multiple apertures formed by at least some of the plurality of metal shapes in the electronic design;
   analyzing the model to generate analysis results for the electronic design; and
   devising the electronic design based in part or in whole upon the analysis results.

2. The computer implemented method of claim 1, further comprising:
   identifying the multiple apertures, wherein
     an aperture of the multiple apertures represents an unoccupied space and is fully enclosed by multiple boundary segments of some metal shapes of the plurality of metal shapes in the electronic design, and
     the aperture causes disconnected electromagnetic field domains in analyzing the model.

3. The computer implemented method of claim 2, wherein the aperture is enclosed by the multiple boundary segments of the some metal shapes, and the some metal shapes belong to one or more layers in the electronic design.

4. The computer implemented method of claim 1, further comprising:

identifying a side of the electronic design to position a floating plane relative to the electronic design in the model;
identifying a spacing value between the floating plane and at least one layer of one or more layers in the electronic design; and
adding the floating plane to the model of the electronic design.

5. The computer implemented method of claim 1, further comprising:
identifying a first spacing value between a first floating plane and a first layer of one or more layers in the electronic design;
adding the first floating plane to the model of the electronic design at the first spacing value to the first layer;
identifying a second spacing value between a second floating plane and a second layer of one or more layers in the electronic design; and
adding the second floating plane to the model of the electronic design at the second spacing value to the second layer.

6. The computer implemented method of claim 5, further comprising:
determining a comparison between a first area of metal shapes exposed to open space for the first floating plane and a second area of metal shapes exposed to the open space for the second floating plane; and
ignoring one floating plane of the first and second floating planes based in part or in whole upon the comparison.

7. The computer implemented method of claim 1, further comprising at least one of:
discretizing the plurality of metal shapes into a plurality of elements; or
determining whether one or more apertures of the multiple apertures are critical apertures.

8. The computer implemented method of claim 1, further comprising:
identifying a shape or size of an aperture of the multiple apertures;
determining a shape or size for a patch of the plurality of patches based in part or in whole upon the shape or size of the aperture; and
positioning the patch over the aperture so that the patch completely covers the aperture when both the patch and the aperture are projected onto a reference plane.

9. The computer implemented method of claim 8, wherein the shape or size of the patch is determined by augmenting the shape or size of the aperture with a constant margin or variable margins.

10. The computer implemented method of claim 1, further comprising:
identifying boundary conditions for electromagnetic field domains in the model; and
applying the boundary conditions to one or more boundary segments of one or more electromagnetic field domains in the model.

11. The computer implemented method of claim 10, wherein the boundary conditions include at least one of a natural boundary condition, an absorbing boundary condition, or a combination of the natural boundary condition and the absorbing boundary condition; and the one or more boundary segments include a boundary segment that is connected to an external environment.

12. The computer implemented method of claim 1, further comprising:

constructing the model by adding at least the plurality of metal shapes, the plurality of patches, and one or more floating planes to the model;
identifying one or more negligible electromagnetic field domains; and
ignoring the one or more negligible electromagnetic field domains in the model.

13. A system for devising an electronic design with disconnected field domains, comprising:
one or more mechanisms, at least one of which comprises at least one microprocessor including one or more processor cores executing one or more threads in a computing system;
a non-transitory computer accessible storage medium storing thereupon program code that includes a sequence of instructions that, when executed by the at least one micro-processor or processor core of a computing system, causes the at least one micro-processor or processor core at least to:
identify a plurality of metal shapes of an electronic design;
reduce computational resource consumption by representing at least a portion of the electronic design with an additional model in a model for the electronic design;
add, at a patching module including or coupled with the at least one micro-processor or processor core of the computing system, a plurality of patches to the model for the electronic design for multiple apertures formed by at least some of the plurality of metal shapes in the electronic design;
analyze the model to generate analysis results for the electronic design; and
devise the electronic design based in part or in whole upon the analysis results.

14. The system of claim 13, wherein the program code includes further instructions that, when executed by the at least one micro-processor or processor core, cause the at least one processor or processor core to:
identifying the multiple apertures, wherein
an aperture of the multiple apertures represents an unoccupied space and is fully enclosed by multiple boundary segments of some metal shapes of the plurality of metal shapes in the electronic design, and the aperture causes disconnected electromagnetic field domains in analyzing the model.

15. The system of claim 13, wherein the program code includes further instructions that, when executed by the at least one micro-processor or processor core, cause the at least one processor or processor core to:
identify a side of the electronic design to position a floating plane relative to the electronic design in the model;
identify a spacing value between the floating plane and at least one layer of one or more layers in the electronic design; and
add the floating plane to the model of the electronic design.

16. The system of claim 13, wherein the program code includes further instructions that, when executed by the at least one micro-processor or processor core, cause the at least one processor or processor core to:
determine a comparison between a first area of metal shapes exposed to open space for a first floating plane and a second area of metal shapes exposed to the open space for a second floating plane; and
ignore one floating plane of the first and second floating planes based in part or in whole upon the comparison.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for devising an electronic design with disconnected field domains, the set of acts comprising:

identifying a plurality of metal shapes of an electronic design;

reducing computational resource consumption by representing at least a portion of the electronic design with an additional model in a model for the electronic design;

adding, at a patching module including or coupled with at least one micro-processor of a computing system, a plurality of patches to the model for the electronic design for multiple apertures formed by at least some of the plurality of metal shapes in the electronic design;

analyzing the model to generate analysis results for the electronic design; and devising the electronic design based in part or in whole upon the analysis results.

18. The article of manufacture of claim 17, the set of acts further comprising:

identifying a shape or size of an aperture of the multiple apertures;

determining a shape or size for a patch of the plurality of patches based in part or in whole upon the shape or size of the aperture; and positioning the patch over the aperture so that the patch completely covers the aperture when both the patch and the aperture are projected onto a reference plane.

19. The article of manufacture of claim 17, the set of acts further comprising:

identifying boundary conditions for electromagnetic field domains in the model; and applying the boundary conditions to one or more boundary segments of one or more electromagnetic field domains in the model, wherein the model is provided as an input to a non-3D solver.

20. The article of manufacture of claim 19, the set of acts further comprising:

constructing the model by adding at least the plurality of metal shapes, the plurality of patches, and one or more floating planes to the model;

identifying one or more negligible electromagnetic field domains; and ignoring the one or more negligible electromagnetic field domains in the model.

* * * * *